United States Patent
Visca et al.

(10) Patent No.: US 6,518,352 B1
(45) Date of Patent: Feb. 11, 2003

(54) FLUOROPOLYMER DISPERSIONS

(75) Inventors: Mario Visca, Alessandria (IT); Daria Lenti, Alessandria (IT); Marco Malvasi, Alessandria (IT); Enrico Marchese, Asti (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/343,238

(22) Filed: Jun. 30, 1999

(30) Foreign Application Priority Data

Jul. 2, 1998 (IT) .......................... MI98A1520

(51) Int. Cl.$^7$ ............................... C08L 27/00
(52) U.S. Cl. ....................................... 524/520
(58) Field of Search ......................... 524/520

(56) References Cited

U.S. PATENT DOCUMENTS

| | | | | |
|---|---|---|---|---|
| 3,864,322 A | * | 2/1975 | Yallourakis | 260/87.5 |
| 3,904,575 A | * | 9/1975 | Satokawa | 260/32.8 |
| 3,953,412 A | * | 4/1976 | Saito | 526/247 |
| 4,333,840 A | * | 6/1982 | Reick | 252/16 |
| 4,536,488 A | * | 8/1985 | Wanke | 502/159 |
| 5,143,783 A | * | 9/1992 | Shimizu | 428/327 |
| 5,392,559 A | * | 2/1995 | Long | 43/121 |
| 5,563,213 A | * | 10/1996 | Mayer | 524/805 |
| 5,576,381 A | | 11/1996 | Bladel et al. | |

FOREIGN PATENT DOCUMENTS

| | | |
|---|---|---|
| DE | 197 26 802 C | 6/1998 |
| EP | 0 657 514 A | 6/1995 |
| EP | 0 894 541 A | 2/1999 |
| GB | 2 051 091 A | 2/1981 |

OTHER PUBLICATIONS

R. Moore et al., "Morphology and Chemical Properties of the Dow Perflourosulfonate Ionomers", *Macromolecules*, 22, 1989, pp. 3594–3599.

* cited by examiner

*Primary Examiner*—Edward J. Cain
(74) *Attorney, Agent, or Firm*—Arent Fox Kintner Plotkin & Kahn PLLC

(57) ABSTRACT

Mixtures of fluoropolymer dispersion, wherein:
a) a dispersion is formed by TFE (co)polymers with average particle sizes in the range 180–400 nm;
b) another dispersion selected from:
  1) (co)polymer dispersion of TFE;
  2) thermoplastic copolymers of TFE;
   the average particle sizes of dispersion b) range from 20 to 60 nm;
   the ratio between the particle sizes of dispersion b) compared with those of dispersion a) is lower than 0.3.

12 Claims, No Drawings

FLUOROPOLYMER DISPERSIONS

The present invention relates to fluoropolymer aqueous dispersions to be used in coating applications for metal and ceramic surfaces and in the textile impregnation.

Specifically, the present invention relates to films obtained from fluoropolymer aqueous dispersions, having an high critical thickness, preferably combined with good optical and mechanical properties.

Critical thickness means the maximum thickness obtainable without cracks and surface defects inside the film.

It is very important from the application point of view to increase the limit of the critical thickness so as to have films without cracks in correspondence with the highest thickness. An higher critical thickness means indeed better film mechanical (e.g. scratch-resistance) and optical properties.

It is known in the art to combine two latexes so as to have a fluoropolymer aqueous dispersion having a bimodal distribution of the particle diameters to prepare useful dispersions in coating applications on metal, glass and ceramics or glass-fiber textiles. Specifically see EP 657,514 which describes the use of fluoropolymer dispersion mixtures, expressly excluding thermoplastic polymers, obtained by emulsion polymerization and mixed to obtain bimodal distributions of the particle sizes in order to optimize, in particular in the textile impregnation sector, the applied polymer amount for each passage without crack formation. The ratio between the particle sizes having a lower diameter with the particle size having an higher diameter is in the range 0.3–0.7. The first dispersion has an average diameter by number in the range 180–440 nm, while the second fluoropolymer dispersion has an average diameter from 50 to 150 nm. The component amount having a lower diameter with respect to the component having an higher diameter is in the range 5–50% by weight, preferably 5–20% by weight. The Examples reported in this patent substantially relate to the textile impregnation and show that, by using an amount of 10% and 18% by weight of the component with the lower size, cracks are eliminated and the amount of the applied fluoropolymer increases. If amounts other than these two values are used, cracks are noticed. The polymer having a lower size has particle sizes of 100 and 110 nm and the above mentioned ratio ranges from 0.45 to 0.5. The only example given on the metal coating shows that with an amount equal to 10% of the fluoropolymer having lower particle size, the film hardness increases, in comparison with the case where the film is obtained by exclusively using the flouropolymer a) with higher sizes as above defined. Tests carried out by the Applicant have shown that in the case of metal coating, by using the dispersions exemplified in the above mentioned patent, there is no increase of critical thickness.

The need was felt to have available fluoropolymer aqueous dispersions able to form films on metals having an higher critical thickness combined with the absence of cracks, preferably with improved optical properties, with respect to the films obtained from the fluoropolymer dispersions of the prior art.

The Applicant has surprisingly found that by using a mixture of two fluoropolymer dispersions having a different granulometric distribution and such that the ratio between the average sizes of the respective particles is well defined, films having the above mentioned properties are obtained.

An object of the present invention are therefore fluoropolymer dispersion mixtures, wherein:

a) a dispersion is formed by tetrafluoroethylene (TFE) homopolymers or by its copolymers with one or more monomers containing at least one ethylene type unsaturation in amounts from 0 up to 8% by weight, preferably from 0.01 to 3% by weight; the average particle sizes range from 190 to 400 nm, preferably from 210 to 300 nm;

b) another dispersion is selected from one or more of the following dispersions:
  1) homopolymer dispersion of tetrafluoroethylene (TFE), or based on its copolymers with one or more monomers containing at least one ethylene type unsaturation in amounts from 0 up to 8% by weight, preferably from 0.01 to 3% by weight;
  2) TFE thermoplastic copolymers, preferably copolymers containing from 7 to 27% by weight of hexafluoropropene; copolymers containing from 0.5 to 18% by weight, in particular from 2 to 10% by weight of one or more perfluoroalkylvinylethers, preferably selected from methyl-, ethyl-, propylvinylether;
  the average particle sizes of the dispersion b) range from 20 to 60 nm, preferably from 20 to 45;
  the ratio between the average particle sizes of the dispersion b) with respect to those of the dispersion a) being lower than 0.3, preferably 0.1 to 0.25, component b) being obtainable by emulsion polymerization.

The dispersion b) can be used even though the average particle size is higher than 60 nm, provided that the particle fraction having sizes defined in b) (average particle size 20–60 nm) is equal to at least 60% by weight, preferably 70% by weight, the ratio by weight between the average particle sizes of 20–60 nm and those of dispersion a) being lower than 0.3.

The Applicant has found that in order to obtain the present invention results, it is important to have at least two dispersions having the above mentioned granulometric distributions. If desired, one or more dispersions having distribution with an average diameter lower than 20 nm, can be added.

Among the TFE comonomers the fluorinated ones are specifically mentioned:

$C_3$–$C_8$ perfluoroolefins, such as hexafluoropropene (HFP);

$C_2$–$C_8$ hydrogenated fluoroolefins, such as vinyl fluoride (VF), vinilydene fluoride (VDF), trifluoroethylene, hexafluoroisobutene, $CH_2$=$CH$—$R_f$ perfluoroalkylethylene, wherein $R_f$ is a $C_1$–$C_6$ perfluoroalkyl;

chloro- and/or bromo- and/or iodo- $C_2$–$C_8$ fluoroolefins, such as chorotrifluoroethylene (CTFE);

$CF_2$=$CFOR_f$ (per)fluoroalkylvinylethers (PAVE), wherein $R_f$ is a $C_1$–$C_6$ (per)fluoroalkyl, for example $CF_3$, $C_2F_5$, $C_3F_7$;

$CF_2$=$CFOX$ (per)fluoro-oxyalkylvinylethers, wherein X is: a $C_1$–$C_{12}$ alkyl, or a $C_1$–$C_{12}$ oxyalkyl, or a $C_1$–$C_{12}$ (per)fluoro-oxyalkyl having one or more ether groups, for example perfluoro-2-propoxy-propyl.

The comonomers which do not substantially decrease the PTFE thermal stability, are preferred.

The preferred fluoropolymers for the dispersion a) are polytetrafluoethylene or polytetrafluoroethylene modified with one or more comonomers having ethylene unsaturation.

The preferred fluoropolymers for the dispersion b) are polytetrafluoroethylene or modified polytetrafluoroethylene. When an improvement of the optical and mechanical properties is desired, thermoplastic fluoropolymers of the type b2), preferably TFE copolymers with perfluoromethylvinylether in amounts between 6 and 7% by weight, optionally containing perfluoropropylvinylether between 0.8 and 1.2% by weight, or TFE copolymers with perfluoropropylvinylether from 4 to 6% by weight, are used.

The type a) aqueous dispersions are obtainable by the conventional emulsion polymerization processes.

The type b) aqueous dispersions are obtainable with the polymerization process in microemulsion described in the Italian patent application MI 98A001519 in the name of the Applicant, filed on the same day as the present application and having for title "TFE polymerization process". The process relates to the preparation of dispersions based on tetrafluoroethylene (TFE) homopolymers, or based on its copolymers with one or more monomers containing at least one ethylene type unsaturation, having a particle fraction equal to at least 60% by weight, preferably 70% by weight, with average diameter sizes in the range 0.005–0.06 $\mu$m, preferably 0.01–0.05 $\mu$m, comprising:

a) preparation of an aqueous microemulsion of perfluoropolyethers (PFPE) having neutral end groups or end groups optionally containing 1 or more H atoms, Cl instead of fluorine;

b) feeding of the microemulsion to the polymerization reactor, in such amount wherefore the microemulsion perfluoropolyether oil phase is present in a concentration higher than 2 ml per liter of reaction medium, preferably from 2.2 ml up to 50 ml per liter, still more preferably from 3 to 30 ml per liter of reaction medium;

c) feeding of the reaction medium into the polymerization reactor, reactor degassing, reactor pressurization with gaseous TFE, optional addition of surfactants, stabilizers, comonomers, chain transfer agents;

d) initiator addition, and optionally during the polymerization of further amounts of surfactants, stabilizers, comonomers, chain transfer agents;

e) discharge from the reactor of the polymeric latex.

In order to obtain the results of the present invention the weight ratio between the component a) and component b) as dry product can range between 99/1 and 90/10, preferably between 99/1 and 95/5 by weight.

The dispersions are usually used at a concentration of the dry product in the range 25%–75% by weight and preferably 40–65% by weight.

The mixture can be obtained by simple mixing the component a) previously concentrated by the known methods (addition of non ionic surfactant and heating or ultrafiltration) with the component b) so as it is obtained from the polymerization autoclave or concentrated as above for component a) or it can be obtained by coconcentration of the two latexes.

The component b) can be concentrated as it is obtained from the polymerization autoclave or after ultracentrifugation. In this case the surfactant dispersion of the ultracentrifugation is used.

In particular by using mixtures of dispersions constituted by the component a) and by the component b), preferably in the composition range from 99/1 to 95/5 by weight, and with the above mentioned particle size ratio, it is possible to considerably increase the critical thickness of the films obtained starting from these mixtures in comparison with the films obtained from the sole component a).

As already said, when in the invention mixtures a thermoprocessable polymer is used as dispersion b), gloss and scratch-resistance of the obtained films are improved.

The obtained dispersion mixture can be suitably formulated in connection with the intended application, with the addition of other resin aqueous dispersions such as for example acrylic resins, silicone resins, polyamidoamidic resins, sins, etc.; pigments, surfactants, inorganic fillers and other additives. After the mixture application to the desired surface, the film is dried and then sintered at a temperature higher than t he polymer melting temperature.

The total surfactant amount necessary to stabilize the mixture of the invention dispersions generally ranges between 2 and 10% and it is preferably between 3 and 6% by weight of the dispersion.

The fluoropolymer aqueous dispersions of the present invention besides for coating applications on metal surfaces can be used also for ceramic surfaces and in the textile impregnation and for obtaining cast films.

The following examples are mentioned for illustrative purposes, but they are not limitative of the invention scope.

EXAMPLES

Characterization

The average particle diameter is measured by a Laser light diffusion-based equipment, in particular on Photon Correlation Spectroscopy, equipped with Brookhaven 2030 AT model correlator and Argon Laser light source having an wave length of 514.5 nm by Spectra-Phisics. The latex specimens to be subjected to measurement, are suitably diluted with water bidistilled and filtered at 0.2 $\mu$m on Millipore filter. The scattering measurement is carried out at room temperature and at an angle of 90°. The latex particle diameter is obtained by the cumulant method.

The polymer content of the latex discharged from the reactor and of the supernatant obtained by ultracentrifugation is evaluated by weight loss at 150° C. for 1 hour. Specifically about 20 grams of latex are weighed in a glass beaker and put in stove to dry for 1 hour at 150° C. The dry product content of the latex is obtained by the formula:

Dry %=(weight after drying/latex initial weight)×100.

In order to determine the per cent fraction of solid separated due to ultracentrifugation, the supernatant dry content after centrifugation is normalized with respect to the latex dry content before centrifugation, according to the formula:

Separated solid %=(Dry part in the supernatant %/Dry part in the latex %)×100

In order to have an estimation of the primary particle granulometry distribution, the latex is subjected to centrifugation at 5000 rpm for 1 hour, by using a Kontron Centrikon H401 model ultracentrifuge. The separated supernatant is subjected to polymer content determination by weight loss and to determination of the primary particle average diameter, as previously described.

Example 1

Preparation of the Microemulsion

In a glass beaker are introduced:

5 parts by weight of ammonic salt of an acid having the structure (I)

$$ClC_3F_6O(C_3F_6O)_nCF_2COOH \quad (I)$$

wherein n is an integer such as to give acidimetric molecular weight equal to 530;

3 parts by weight of a perfluoropolyether having a type II structure and average molecular weight by number 700:

$$R_fO(C_3F_6O)_{n'}(CFXO)_{m'}R'_f \quad (II)$$

wherein n' and m' are integers such as to give the above mentioned average molecular weight by number, X=F, $CF_3$; $R_f$, $R'_f$, equal to or different from each other are perfluoroalkyls from 1 to 3 carbon atoms;

8 parts by weight of water.

The resulting microemulsion appears perfectly limpid in a temperature range between 2° C. and 46° C.

Polymerization (Dispersion b)

200 g of the preceding microemulsion are added to 3 liters of suitably degassed water in a 5 liters autoclave equipped with a mechanical stirrer and previously put under vacuum.

The autoclave is kept under mechanical stirring and is pressurized with tetrafluoroethylene (TFE) up to a 20 bar pressure at 80° C. temperature. At this point 100 g of ammonium persulphate (APS) solution corresponding to 240 mg of APS are fed into the autoclave. When the pressure in the reactor has decreased of 0.5 bar, TFE is fed by a compressor so as to maintain a constant pressure of 20 bar inside the reactor. In the meantime the reactor internal temperature is stably maintained at 80° C. After 48 minutes, the TFE feeding is stopped, the reactor evacuated and cooled.

An aqueous dispersion containing 280 g/kg of polymeric resin is obtained. The polymer primary particle diameter measured by Laser Light Scattering (LLS) results equal to 53 nm. After ultracentrifugation at 5,000 rpm for 1 hour, an amount of solid (coarse particles) equal to 5.9% by weight of the total is separated and the LLS measurement on the surfactant phase gives a 40 nm as average value. The obtained dispersion in Example 1, having average particle size diameter 53 nm, has 94.1% by weight of average particle size diameter 40 nm. Therefore as component b), according to the present invention can be used both as obtained dispersion (53 nm) and as surfactant (40 nm).

Example 2

Polymerization (Dispersion b)

2,130 grams of the Example 1 microemulsion, equivalent to 6.8 ml/liter of perfluoropolyether, are added to 30 liters of suitably degassed water in a 50 liter autoclave equipped with a mechanical stirrer and previously put under vacuum. In the reactor also 140 grams of paraffin with softening point in the range 52° C.–54° C. were previously introduced. 500 cc of a $(NH_4)_2Fe(SO_4)_2 6H_2O$ (SdM) solution equivalent to 500 mg of SdM are fed into the autoclave. The autoclave is kept under mechanical stirring and is pressurized with TFE up to a 20 bar pressure at 75° C. temperature. 500 cc of a $(NH_4)_2S_2O_8$ (APS) solution equivalent to 1500 mg of APS are then fed into the autoclave.

When the pressure in the reactor has decreased of 0.5 bar, TFE is fed by a compressor so as to maintain a constant pressure of 20 bar inside the reactor. In the meantime the reactor internal temperature is increased up to 85° C. at a rate equal to 0.2° C./min. After 18 minutes, the TFE feeding is stopped, the reactor evacuated and cooled. An aqueous dispersion containing 225 g/kg of polymeric resin is obtained.

The polymer primary average particle diameter measured by Laser Light Scattering (LLS) results equal to 108 nm. After ultracentrifugation at 5,000 rpm for 1 hour, an amount of solid (coarse particles) equal to 23.2% by weight of the total is separated and the LLS measurement on the surnatant phase gives a 35 nm as average value.

The obtained dispersion in Example 2 having average particle size diameter 108 nm, has 76.8% by weight of average particle size diameter 35 nm. Therefore as component b), according to the present invention, can be used both as obtained dispersion (108 nm) and as surnatant (35 nm)

Example 3 (Comparative)

Polymerization

The emulsion polymerization is carried out at the TFE constant pressure of 20 bar in a 50 liters autoclave. In the autoclave 31 liters of deionized and degassed water, 29 g of ammonium perfluorooctanoate, 140 g of paraffin with softening point in the range 52–54° C., 1000 mg of ammonium persulphate are introduced. The autoclave is put under vacuum for ten minutes, subsequently 100 g of perfluoropropylvinylether are introduced. The autoclave is kept under mechanical stirring and is pressurized with TFE up to a 20 bar pressure at 55° C. temperature. At this point 500 cc of a $(NH_4)_2S_2O_8$ (APS) solution corresponding to 1450 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is increased up to 75° C. at a rate equal to 0.7° C./min.

When 3.5 kg of TFE have reacted, the TFE feeding is stopped, the reactor evacuated and put under vacuum. An aqueous dispersion containing 11% by weight of polymer is obtained.

The polymer primary average particle diameter measured by Laser Light Scattering (LLS) results equal to 115 nm. After ultracentrifugation at 5,000 rpm for 1 hour, the 98% of the polymer is separated. The surnatant contains 2% by weight of particles having 100 nm average sizes.

The obtained dispersion in Example 3 having average particle size diameter 115 nm, has 98% by weight of average article size diameter 100 nm. The % of the fraction from 20 to 60 nm is lower than 2% by weight.

Example 4

A mixture consisting of two dispersions of polytetrafluoroethylene (PTFE) having a total percentage of final solid of 57% by weight with a ratio by weight between the polymers of the two dispersions equal to 96/4, dispersion a)/dispersion b) is prepared. The component a) of the mixture is a commercial product Ausimont Algoflon D60 EXP96® while the component b) is dispersion of Example 1. The particle diameters, measured by the Laser Light Scattering method, are respectively 250 and 53 nm with a particle diameter ratio between the component b) and component a) equal to 0.21.

The mixture of the two dispersions, containing the 3% total of non ionic surfactant Triton X100, is charged with an acrylic paste and sprayed on a primerized aluminum plate, dried at 100° C. for two minutes and then sintered at 420° C. for 10 minutes. The final composition of the applied acrylic formualtion is formed by the following parts by weight of the various components: 45 of PTFE, 1.5 of the Rhodopas D906 acrylic resin, 3.5 of Triton X100, 1.2 of sodium salt and of triethanolamine of the lauryl acid, 0.5 of mica, 2 of xylene, 2 of butylcellosolve and the complement to 100 is water.

On the sintered film, the critical thickness is determined by optical microscopy. Such critical thickness is compared with that measured on the film obtained by the pure component a). An increase of the critical thickness from 35 to 50 $\mu$m is measured, passing from the pure dispersion a) to the mixture containing 4% by weight of dispersion b).

Example 5

A mixture consisting of two dispersions of polytetrafluoroethylene (PTFE) having a total percentage of final solid of 55% by weight with a ratio by weight between the polymers of the two dispersions, dispersion a)/dispersion b) respectively equal to 95.5/4.5 and 96.5/3.5, is prepared. The component a) of the mixtures is a commercial product Ausimont Algoflon D60 T11® while the component b) is dispersion of Example 2. The particle diameters, measured by the Laser Light Scattering method, are respectively 227 and 108 nm with a particle diameter ratio between the component b) and component a) equal to 0.48; the ratio between dispersion b)/dispersion a), considering the fraction 76.8%. by weight of average particle size lower than 60 nm, is 0.154.

The mixtures of the above mentioned dispersions, containing the total 3% of non ionic surfactant Triton X100, are charged with the acrylic paste of Example 4 and sprayed on a primerized aluminum plate, dried at 100° C. for two minutes and then sintered at 420° C. for 10 minutes.

On the sintered film, the critical thickness is determined by optical microscopy. Such critical thickness is compared with that measured on the film obtained by the pure component a). A critical thickness of 40 µm is measured for both the mixtures in comparison with the critical thickness of 24 µm measured for the pure dispersion a).

Example 6

Two mixtures consisting of two dispersions of polytetrafluoroethylene (PTFE) having a total percentage of the final solid of 55% by weight with a ratio by weight between the polymers of the two dispersions dispersion a)/dispersion b) equal to, respectively, 95.2/4.8 and 96.7/3.3, are prepared. The component a) of the mixture is a commercial product Ausimont of Example 5 while the component b) is the surnatant of Example 1. The particle diameters, measured by the Laser Light Scattering method, are respectively 227 and 40 nm with a particle diameter ratio between the component b) and component a) equal to 0.176.

The mixtures of the above mentioned dispersions, containing the total 3% of non ionic surfactant Triton X100, are charged with the acrylic paste of Example 4 and sprayed on a primerized aluminum plate, dried at 100° C. for two minutes and then sintered at 420° C. for 10 minutes.

On the sinterized film, the critical thickness is determined by optical microscopy. Such critical thickness is compared with that measured on the film obtained by the pure component a). A critical thickness of 42 µm is measured for the mixture with component b) at 4.8% by weight, for the mixture with component b) at 3.3% a criticl thickness of 40 µm, in comparison with the critical thickness of 24 µm measured for the pure dispersion a).

Example 7

A mixture consisting of two dispersions of polytetrafluoroethylene (PTFE) having a total percentage of the final solid of 57% by weight with a ratio by weight between the polymers of the two dispersions dispersion a) and dispersion b) equal to 96/4, is prepared. The component a) of the mixture is a commercial product Ausimont of Example 5 while the component b) is surnatant of Example 1. The particle diameters, measured by the Laser Light Scattering method, are respectively 227 and 40 nm with a particle diameter ratio between the component b) and component a) equal to 0.176.

The mixture of the two dispersions, containing the total 3% of non ionic surfactant Triton X100, is charged with two different pastes: the acrylic paste of Example 4 and a paste having the same composition except for the base resin which is a silicone type resin. Both formulations are sprayed on primerized aluminum plates, dried at 100° C. for two minutes and then sintered at 420° C. for 10 minutes.

On the sintered film, the critical thickness is determined by optical microscopy. Such critical thickness is compared with that measured on the film obtained using the pure dispersion a). An increase of the critical thickness is measured passing from the pure component a) to the mixtures containing 4% by weight of the dispersion b), as shown in Table 1.

TABLE 1

| component a) % by wt. | component b) % by wt. | Acrylic paste | Silicone paste | Critical thickness (µm) |
|---|---|---|---|---|
| 100 | 0 | present | absent | 24 |
| 100 | 0 | absent | present | 35 |
| 96 | 4 | present | absent | 40 |
| 96 | 4 | absent | present | 48 |

Example 8

A mixture consisting of two dispersions of polytetrafluoylene (PTFE) having a total percentage of the final solid of 57% by weight with a ratio by weight between the polymers of the two dispersions dispersion a)/dispersion b) equal to 96.1/3.9, is prepared. The component a) of the mixture is a commercial product Ausimont Algoflon of Example 5 while the component b) is surnatant of Example 2. The particle diameters, measured by the Laser Light Scattering method, are respectively 227 and 35 nm with a particle diameter ratio between the component b) and component a) equal to 0.154.

The mixture of the two dispersions, containing the total 3% of non ionic surfactant Triton X100, is charged with a pigmented acrylic paste and sprayed on a primerized aluminum plate, dried at 100° C. for two minutes and then sintered at 420° C. for 10 minutes. The final composition of the applied pigmented acrylic formulation is constituted by the following parts by weight of the various components: 46 of PTFE, 2 of the acrylic resin Rhodopas D906, 4 of $TiO_2$ Kronos 2310, 3 of Triton X100, 0.3 of the oleic acid triethanolamine salt, 1.2 of the lauryl acid sodium salt, 0.5 of mica, 2 of xylene, 2 of butylcellosolve, 0.4 of Orotan 850 and the complement to 100 of water.

On the sintered film, the critical thickness is determined by optical microscopy. Such critical thickness is compared with that measured on the film obtained by the pure component a). An increase of the critical thickness from 35 to 45 µm is measured passing from the pure dispersion a) to the mixture containing 3.9% by weight of the dispersion b).

Example 9

Two mixtures consisting of two dispersions of PTFE both having a total percentage of the final solid of 59% by weight with a ratio by weight between the polymers of the two dispersions dispersion a) dispersion b) equal to 95.5/4.5 and 97/3, are prepared. The component a) of the mixture is a commercial product Ausimont Algoflon of Example 5 having average particle size of 245 nm while the component b) is a thermoplastic polymer in the form of aqueous dispersion Hyflon D 3070X having average size diameter of 60 nm. The particle diameters, measured by the Laser Light Scattering method, are respectively 245 and 60 nm with a diameter ratio equal to 0.245.

Both the mixtures of the two dispersions, containing the total 3% of non ionic surfactant Triton X100, are charged with the acrylic paste of Example 4. The obtained formulation is sprayed on primerized aluminum plates, dried at 100° C. for two minutes and then sintered at 420° C. for 10 minutes.

On the sintered film, the critical thickness is determined by optical microscopy. Such critical thickness is compared with that measured on the film obtained by the pure component a). As shown in Table 2, an increase of the critical thickness and gloss is measured passing from the pure component a) to the mixtures.

TABLE 2

| component a) % by weight | component b) % by weight | Critical thickness (μm) | Gloss |
|---|---|---|---|
| 100 | 0 | 24 | 17 |
| 95.5 | 4.5 | 42 | 27 |
| 97 | 3 | 35 | 25 |

The scratch-resistance of a film obtained from the pure component a) and of a film obtained from a mixture of dispersions having the following composition by weight: component a/component b)=95.5/4.5, has been determined. The experimental method to evaluate the scratch-resistance consists in measuring the weight connected to a sharp tip, which is necessary to cause a cut in the film. The test is carried out in air at room temperature and with the plate dipped in water at 100° C. and in oil at 180° C. The values reported in Table 3 show that in all cases there is an increase of the scratch-resistance film, passing from the film consisting of the pure dispersion a) to the present invention dispersion mixture.

TABLE 3

| comp. a) % by wt. | comp. b) % by wt. | Load $T_{room}$ (g) | Load in $H_2O$ T = 100° C. (g) | Load in oil T = 180° C. |
|---|---|---|---|---|
| 100 | 0 | 1225 | 935 | 565 |
| 95.5 | 4.5 | 1355 | 1125 | 785 |

Example 10 (Comparative)

Two mixtures consisting of 2 dispersions of polytetrafluoroethylene (PTFE) having a total percentage of the final solid of 55% by weight with a ratio by weight between the polymers of the 2 dispersions equal to, respectively, 95/5 and 90/10, are prepared. The former component of the mixtures is a commercial product Ausimont Algoflon of Example 5 while the latter component is drawn from Example 3 (comparative). The particle diameters, measured by the Laser Light Scattering method, are respectively 227 and 115 nm with a particle diameter ratio between the second component and the first component equal to 0.51. The % of the fraction from 20–60 nm is lower than 2% by weight.

The mixtures of the above mentioned dispersions, containing the total 3% of non ionic surfactant Triton X100, are charged with the acrylic paste of Example 5 and sprayed on a primerized aluminum plate, dried at 100° C. for two minutes and then sintered at 420° C. for 10 minutes.

On the sintered film, the critical thickness is determined by optical microscopy. Such critical thickness is compared with that measured on the film obtained by the first pure component. As shown in Table 4, with a particle diameter ratio forming the two dispersions higher than 0.3, no increase of the critical thickness is noticed.

TABLE 4

| component 1 % by weight | component 2 % by weight | Critical thickness (μm) |
|---|---|---|
| 100 | 0 | 24 |
| 95 | 5 | 24 |
| 90 | 10 | 24 |

Example 11 (Comparative)

Two mixtures consisting of 2 dispersions of polytetraoethylene fluoroethylene (PTFE) having a total percentage of the final solid of 59% by weight with a ratio by weight between the polymers of the 2 dispersions equal to, respectively, 95/5 and 90/10, are prepared. The former component of the mixtures is a commercial product Ausimont Algoflon of Example 5 while the latter component is a thermoplastic polymer Hyflon® latex. The particle diameters, measured by the Laser Light Scattering method, are respectively 245 and 180 nm with a particle diameter ratio between the second component and the first component equal to 0.73.

The mixtures of the above mentioned dispersions, containing the total 3% of non ionic surfactant Triton X100, are charged with the acrylic paste of Example 4 and sprayed on a primerized aluminum plate, dried at 100° C. for two minutes and then sintered at 420° C. for 10 minutes.

On the sintered film, the critical thickness is determined by optical microscopy. Such critical thickness is compared with that measured on the film obtained by the first pure component. As shown in Table 5, with a particle diameter ratio forming the two dispersions higher than 0.3, no increase either of the critical thickness or the film gloss is noticed.

TABLE 5

| component 1 % by wt. | component 2 % by wt. | Critical thickness (μm) | Gloss |
|---|---|---|---|
| 100 | 0 | 24 | 17 |
| 95 | 5 | 24 | 17 |
| 90 | 10 | 24 | 17 |

What is claimed is:
1. A mixture of fluoropolymer aqueous dispersions, wherein:
   a) a dispersion is formed of a tetrafluoroethylene (TFE) homopolymer or of a copolymer of TFE and one or more monomers containing at least one ethylenic unsaturation in amounts from 0 up to 8% by weight, the average particle size ranges from 210 to 400 nm;
   b) a second dispersion is selected from at least one of:
      1) a tetrafluoroethylene (TFE) homopolymer dispersion, or a dispersion based on a copolymer of TFE and one or more monomers containing at least one ethylenic unsaturation in an amount from 0 up to 8% by weight; and
      2) TFE thermoplastic copolymers containing from 7 to 27% by weight of hexafluoropropene; copolymers containing from 0.5 to 18% by weight of one or more perfluoroalkylvinylethers;
      wherein the average particle size of the b) dispersion ranges from 20 to 60 nm; the ratio between the average particle sizes of the dispersion b) with those of the dispersion a) being less than 0.3, component b) obtained by microemulsion polymerization.

2. The mixture of fluoropolymer aqueous dispersions according to claim 1, wherein dispersion b) has an average particle size higher than 60 nm, and comprises at least 60% by weight of a particle fraction having an average particle size from 20–60 nm, wherein the ratio between the average particle size of the particle fraction of dispersion b) with that of dispersion a) is less than 0.3.

3. The mixture of fluoropolymer aqueous dispersions according to claim 1, comprising one or more dispersions with an average diameter lower than 20 nm.

4. The mixture of fluoropolymer aqueous dispersions according to claim 1, wherein the monomers are selected from the group consisting of:

a $C_3$–$C_8$ perfluoroolefin;

a $C_2$–$C_8$ chloro-, bromo- and/or iodo-fluoroolefin;

a (per)fluoroalkylvinylether of formula $CF_2$=$CFOR_f$ (PAVE), wherein $R_f$ is a $C_1$–$C_6$ (per)fluoroalkyl;

a (per)fluoro-oxyalkylvinylether of formula $CF_2$=CFOX, wherein X is a $C_1$–$C_2$ alkyl, a $C_1$–$C_{12}$ oxyalkyl, or a $C_1$–$C_{12}$ (per)fluoro-oxyalkyl having one or more ether groups.

5. The mixture of fluoropolymer aqueous dispersions according to claim 1, wherein the fluoropolymers of a) are polytetrafluoroethylene or polytetrafluoroethylene modified with one monomer having ethylenic unsaturation, and the fluoropolymers of b) are polytetrafluoroethylene or modified polytetrafluoroethylene.

6. The mixture of fluoropolymer aqueous dispersions according to claim 1, wherein the b2) type fluoropolymers are TFE copolymers with perfluoromethylvinylether in amounts between 6 and 7% by weight or TFE copolymers with perfluoropropylvinylether from 4 to 6% by weight.

7. The mixture of fluoropolymer aqueous dispersions according to claim 1, wherein the type a) dispersions are obtained with an emulsion polymerization process and the type b) dispersions are obtained with a microemulsion polymerization process, comprising:

a) preparing an aqueous microemulsion of perfluoropolyethers (PFPE) having neutral end groups or end groups, optionally containing 1 or more H or Cl atoms instead of fluorine;

b) feeding into a polymerization reactor a microemulsion up to a concentration of the microemulsion perfluoropolyether oil phase higher than 2 ml per liter of reaction medium;

c) degassing the reactor, and pressurizing the reactor with gaseous TFE, and, optionally adding a surfactant, a stabilizer, a monomer or a transfer agent;

d) adding an initiator; and e) discharging a polymer latex from the reactor.

8. The mixture of fluoropolymer aqueous dispersions according to claim 1, wherein the weight ratio between the dispersion of a) and the dispersion of b) as a dry product is in a range of 99/1–90/10.

9. The mixture of fluoropolymer aqueous dispersions according to claim 1, comprising other aqueous resin dispersions selected from the group consisting of acrylic resins, silicone resins and polyamidoamidic resins.

10. The mixture of fluoropolymer aqueous dispersions of claim 1, wherein the particle size of dispersion a) is from 210 to 300 nm.

11. A process for coating a metal surface comprising providing a metal surface and coating the metal surface in a mixture of a fluoropolymer dispersion, wherein:

1) a dispersion is formed of a tetrafluoroethylene (TFE) homopolymer or of a copolymer of TFE and one or more monomers containing at least one ethylenic unsaturation in amounts from 0 up to 8% by weight, the average particle size ranges from 210 to 400 nm;

2) a second dispersion is selected from at least one of:

a) a tetrafluoroethylene (TFE) homopolymer dispersion, or a dispersion based on a copolymer of TFE and one or more monomers containing at least one ethylenic unsaturation in an amount from 0 up to 8% by weight;

b) TFE thermoplastic copolymers containing from 7 to 27% by weight of hexafluoropropene; copolymers containing from 0.5 to 18% by weight of one or more perfluoroalkylvinylethers;

wherein the average particle size of the b) dispersion ranges from 20 to 60 nm; the ratio between the average particle sizes of the dispersion b) with those of the dispersion a) being less than 0.3, component b) obtained by microemulsion polymerization.

12. The mixture of fluoropolymer aqueous dispersions according to claim 1, comprising pigments, surfactants, inorganic fillers and other additives.

* * * * *